Patented Jan. 27, 1953

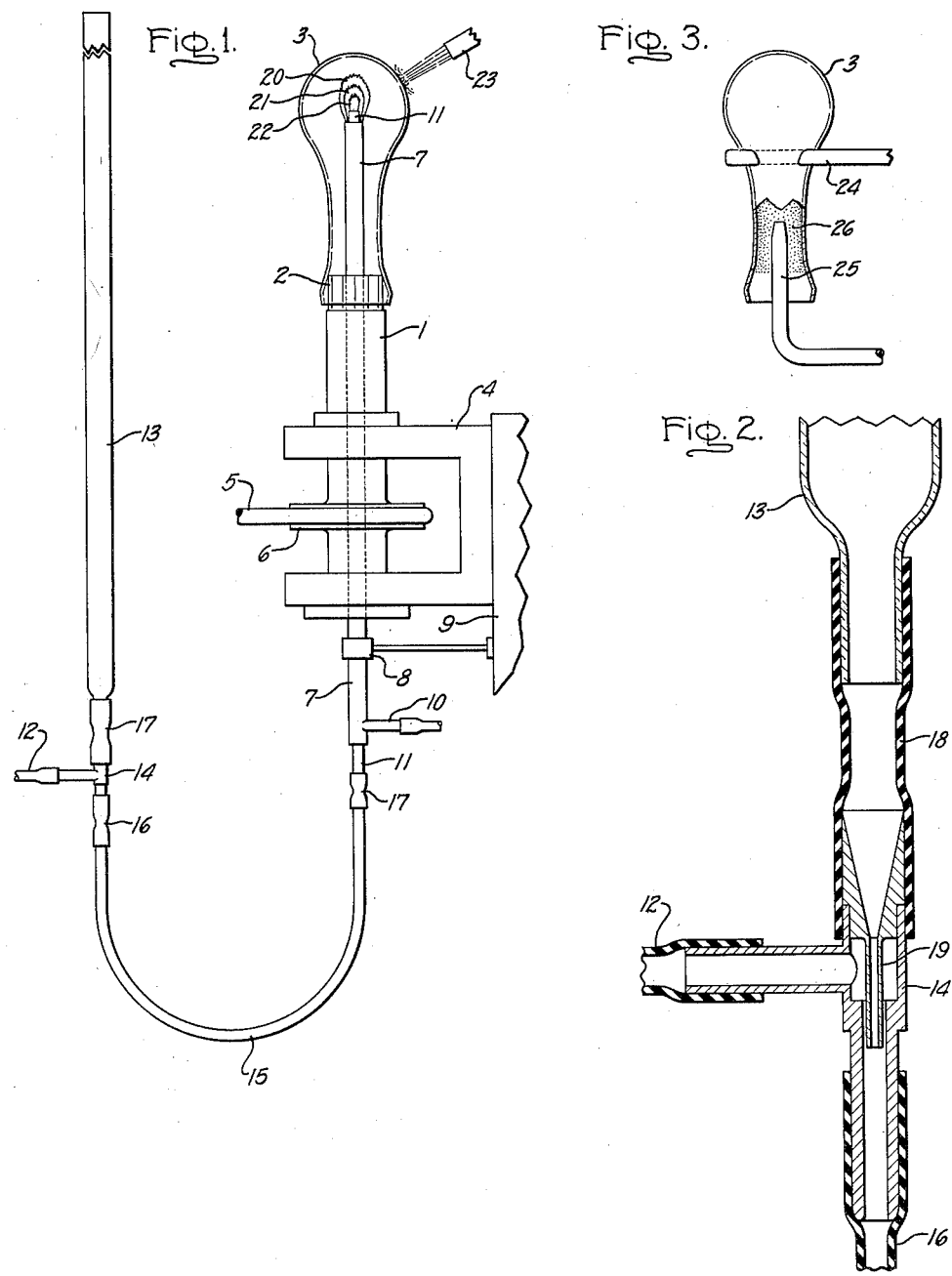

2,626,874

UNITED STATES PATENT OFFICE 2,626,874

METHOD FOR FORMING SILICA AND FOR COATING LAMP BULBS

Marvin Pipkin, Cleveland Heights, Ohio, assignor to General Electric Company, a corporation of New York Application June 30, 1948, Serial No. 36,036

5 Claims. (Cl. 117—18)

My invention relates to methods and apparatus for applying light-diffusing coatings to the interior surfaces of electric lamp bulbs or enclosures. My invention further relates to novel methods and apparatus for producing extremely fine particles of silica.

In my application Serial No. 878, filed January 7, 1948, now Patent No. 2,545,896, which is a continuation-in-part of my application Serial No. 728,769, filed February 15, 1947, and now abandoned, I have disclosed and claimed electric lamp bulbs or enclosures and methods or apparatus for producing the same, wherein the bulbs or enclosures were provided with a highly efficient and adherent light-diffusing coating consisting of extremely finely divided particles of amorphous silica. In accordance with that disclosure the coating was formed by depositing or condensing the silica from a fume or smoke produced by burning within the bulb or enclosure an inflammable silicon compound such as ethyl silicate.

While the process described above has proved to be eminently successful, I have now discovered that such coatings may be produced by further improvements in methods and apparatus involving the combustion of powdered silicon. Among the advantages which may be expected of this invention are greater economy by virtue of less expensive starting material, and better adaptability to high-speed production.

Further features and advantages of my invention will appear from the following detailed description and from the drawing wherein Fig. 1 is an elevation of a species of apparatus with which the invention may be practiced, Fig. 2 is an elevation, in cross-section and on an enlarged scale, of a portion of the apparatus shown in Fig. 1, and Fig. 3 is a somewhat diagrammatic elevation illustrating a step of drying a coated bulb.

I have discovered that under certain circumstances and conditions elemental silicon may be burned to form extremely fine particles of pure silica. Attempts heretofore made to burn silicon in solid form have not been successful because when the silicon burns it is coated with a layer of silica on the surface thereof which prevents further burning. According to my invention, it is necessary that finely divided particles of silicon be projected through a flame so that the silica formed is out in space and collects on an adjacent surface. This is most conveniently accomplished by burning a stream or spray of a combustible fluid carrying the finely divided silicon in suspension.

Although in their broader aspects the methods and apparatus comprising my invention have more general utility, they will be described herein with particular reference to the manufacture of light-diffusing electric lamp bulbs.

Generally speaking, therefore, the method comprising my invention, as applied to the manufacture of diffusing lamp bulbs, involves the burning of finely divided or powdered silicon within the bulb and collecting or condensing the resulting silica particles on the inside surface of the bulb, the bulb being revolved around the inserted burner or torch. It seems that the presence of moisture during deposition of the material is highly desirable or even necessary to the formation of an adherent diffusing coating, although it also seems necessary to remove the moisture immediately after application of the coating. Accordingly, the method preferably comprises the steps of burning the powdered silicon within the bulb, application of heat to the bulb to remove moisture or vapor of combustion, and application of further heat or other drying media such as a current of air after the deposition of the silica coating to dry the coating and remove any residual moisture from the inside of the bulb. Excessive condensation of moisture in the coating seems to result in decreased apparent density and spottiness of the coating upon standing for several hours.

Further features and details of the process will be explained in connection with the following description of a species of apparatus with which the process may be carried out.

Referring to the drawing, the apparatus illustrated therein comprises a hollow chuck or spindle 1 having a compressible collet 2 for supporting the bulb 3 by its neck portion. The spindle 1 is rotatably mounted on a bracket 4 and is driven from any suitable source of power by a belt 5 encircling a pulley 6 attached to the spindle 1. The burner or torch comprises an oxygen-supply tube 7 which extends through the spindle 1 and is adjustably supported by a clamp 8 extending from a suitable base 9 which also carries the bracket 4. Oxygen is supplied to the tube 7 through a side tube 10 at the lower end thereof. A gas-supply tube 11 extends through and slightly above the tube 7 and is joined to the lower end of said tube 7 by brazing or soldering whereby the said lower end of tube 7 is sealed.

The tube 11 is supplied from a conduit 12 with a combustible gas carrying entrained silicon powder which is drawn into the gas stream from a container or hopper 13. The gas flows into the tube 11 from conduit 12 through a T-nipple 14 and a copper conduit 15 which is connected to T-nipple 14 and tube 11 by rubber nipples 16, 17. The container 13 is connected to T-nipple 14 by a rubber nipple 18. The powdered silicon in container 13 is drawn into the gas stream by an aspirator arrangement comprising a jet or orifice tube 19 around which the gas flows and through which the powdered silicon is drawn.

In operation of the apparatus the hopper or container 13 is filled with a supply of finely divided or powdered silicon. The flow of combustible gas is then started through conduit 12, powdered silicon being drawn into the gas stream from container 13, thence through conduit 15 and upward through burner tube 11. An oxygenous gas, preferably oxygen, is also supplied to tube 7 and it issues from the upper end thereof around the stream of combustible gas with its entrained silicon powder issuing from the upper end of burner tube 11. The output of the torch or burner is ignited to burn the silicon in an atmosphere of the gas (for example, natural gas) and excess oxygen. The silicon is burned to form vapors or fumes of extremely small particles of silica which are deposited or condensed on the entire inside surface of the bulb 3 enclosing the flame and supported on the rotating spindle 1. The remaining products of combustion flow downward through the bulb and through the hollow spindle 1.

The flame from burner 11, 7 is characterized by an outer yellowish silicon flame 20 surrounding a centrally positioned blue flame 21 and a still smaller centrally positioned yellow flame 22 from the natural gas. All the particles of powdered silicon are caused to pass through a flame having an excess of oxygen so as to convert all the silicon to silicon dioxide (silica).

I also found it advantageous to heat the bulb 3 during deposition of the silica thereon, as by playing on the outside of the bulb a flame from a Bunsen burner 23. The heating (supplementing that of the flame inside the bulb) assists in expelling moisture which forms at the start of the coating operation. The heat also produces a more uniform coating if the outer bulb surface is heated until the colorless flame from the Bunsen burner turns yellow next to the bulb surface, the yellow color being due to sodium in the usual lime glass from which the bulb is made.

It may also be advantageous to vibrate or tap the conduit 15 or container 13 periodically to insure adequate feeding of silicon powder into the gas stream.

I have successfully coated bulbs 3 of the size known as A21, having the shape shown in the drawing and having a maximum diameter at the globular portion of 2⅝ inches, by employing silicon powder of such fineness as to pass a 200 or 325 mesh screen, and adjusting the flow of combustible gas to give a flame about one inch high, and supplying oxygen at the rate of about 1700 to 3000 cc. per minute, the flame extending to within about ½ to 1 inch from the top of the bulb 3. Under these conditions the flow of silicon particles has a sufficiently low velocity so that they are exposed to or in contact with the oxygen long enough to be substantially completely oxidized to silica. The bulb 3 may be exposed to the flame for about ½ to 1 minute, closer to ½ minute on the average.

In order to avoid excessive condensation of moisture in the coated bulb and apparent loss in coating density, I find it advantageous, immediately following the application of the silica coating, to dry the bulb, as by placing it in a holder 24 (Fig. 3) over an air stream from a jet 25 while another bulb is being coated for about a half minute. The coating is indicated by the stippling 26.

As an alternative to the combustible gas, the powdered silicon may be entrained or suspended in other combustible or inflammable fluids, such as liquid alcohol, the suspension being sprayed from a suitable burner nozzle extending into the bulb and ignited therein. Various fluids may be used but it is in general preferable to avoid those which produce excessive amounts of carbon upon burning. In other words, it is desirable that the flame be a clean one.

The silica particles produced by the processes described herein are of the same order of fineness as those produced by the burning of silicon compounds in accordance with the disclosures in my aforementioned application. Thus, the interior surface of the bulb 3, which may be either clear or frosted by etching in accordance with the process described in my Patent No. 1,687,510, is covered with pure amorphous silica particles having an average diameter of about ⅕ to ⅗ microns. As in the case of the coating produced by the method disclosed in my aforementioned applications, a thin underlayer of the silica particles is fritted or fused to the inner glass surface of the bulb 3. The bulbs may be made into incandescent lamps containing the conventional tungsten filaments and may be filled with an inert gas, preferably argon containing not more than 5 per cent of nitrogen by volume, for instance 2 per cent, in accordance with the teachings of my aforementioned co-pending application Serial No. 878.

What I claim as new and desire to secure by Letters Patent of the United States is:

1. The method of providing glass electric lamp bulbs with a highly diffusing coating of extremely fine particles of amorphous silica which comprises carrying into the bulb a stream of combustible fluid having suspended therein finely divided particles of powdered silicon, burning the said fluid stream in the presence of oxygen in excess of the amount required to convert all the powdered silicon to silica and with the said stream adjusted to a sufficiently low velocity to ensure exposure of the silicon particles to the oxygen long enough to be substantially completely oxidized, revolving the bulb about its axis, and maintaining the combustion for a sufficient time to produce a light-diffusing layer of a desired density on the inner surface of the bulb while substantially simultaneously applying heat to the bulb to assist in removing moisture of combustion from the interior thereof.

2. The method of providing glass electric lamp bulbs with a highly diffusing coating of extremely fine particles of amorphous silica which comprises carrying into the bulb a stream of combustible fluid having suspended therein finely divided particles of powdered silicon, burning the said fluid stream in the presence of oxygen in excess of the amount required to convert all the powdered silicon to silica and with the said stream adjusted to a sufficiently low velocity to ensure exposure of the silicon particles to the oxygen long enough to be substantially completely oxidized, maintaining the combustion for a sufficient time to produce a light-diffusing layer of a desired density on the inner surface of the bulb, and simultaneously applying heat to the exterior of the bulb to assist in removing moisture of combustion from the interior of the bulb.

3. The method of providing glass electric lamp bulbs with a highly diffusing coating of extremely fine particles of amorphous silica which comprises carrying into the bulb a stream of combustible fluid having suspended therein finely divided particles of powdered silicon, burning the said fluid stream in the presence of oxygen in excess of the amount required to convert all the powdered silicon to silica and with the said stream adjusted to a sufficiently low velocity to ensure exposure of the silicon particles to the oxygen long enough to be substantially completely oxidized, maintaining the combustion for a sufficient time to produce a light-diffusing layer of a desired density on the inner surface of the bulb, and immediately thereafter flowing a current of air into the bulb to dry the coating by removing therefrom residual moisture of combustion.

4. The method of providing glass electric lamp bulbs with a highly diffusing coating of extremely fine particles of amorphous silica which comprises entraining finely divided particles of powdered elemental silicon in suspension in a stream of combustible gas, directing the mixture so formed into a bulb and igniting it to form a soft flame, supplying to the said flame an amount of oxygen in excess of that required to support combustion and convert all the powdered silicon to silica and adjusting the flow of powdered silicon and gas to a sufficiently low velocity to ensure exposure of the silicon particles to the oxygen long enough to be completely oxidized, and maintaining the combustion for a sufficient time to produce a light-diffusing layer of a desired density on the inner surface of the bulb while simultaneously applying heat to the exterior of the bulb to assist in removing moisture of combustion from the interior thereof, and immediately thereafter flowing a current of air into the bulb to dry the coating.

5. The method of forming extremely fine particles of amorphous silica which comprises entraining finely divided particles of powdered silicon in suspension in a stream of combustible fluid, igniting the mixture so formed and supplying thereto a quantity of oxygen in excess of that required to support combustion and convert all the powdered silicon to silica and with the flow of said stream adjusted to a sufficiently low velocity to ensure exposure of the silicon particles to the oxygen long enough to be substantially completely oxidized, and maintaining the combustion while collecting the resultant silica particles on an adjacent surface while substantially simultaneously heating the coated surface to assist in expelling moisture of combustion.

MARVIN PIPKIN.

REFERENCES CITED

The following references are of record in the file of this patent:

UNITED STATES PATENTS

| Number | Name | Date |
| --- | --- | --- |
| 875,674 | Potter | Dec. 31, 1907 |
| 1,237,520 | Ivery | Aug. 21, 1917 |
| 1,638,369 | Skaupy | Aug. 9, 1927 |
| 2,137,442 | Callan | Nov. 22, 1938 |
| 2,173,484 | Lerch et al. | Sept. 19, 1939 |
| 2,280,890 | Calbick et al. | Apr. 28, 1942 |
| 2,329,632 | Marsden | Sept. 14, 1943 |
| 2,336,946 | Marden et al. | Dec. 14, 1943 |

FOREIGN PATENTS

| Number | Country | Date |
| --- | --- | --- |
| 234,969 | Great Britain | June 11, 1925 |